United States Patent
Von Merkatz et al.

(10) Patent No.: US 9,212,635 B2
(45) Date of Patent: Dec. 15, 2015

(54) FILTER DEVICE

(75) Inventors: Hendrik Von Merkatz, Remseck (DE); Eugen Wohlmann, Oehringen (DE)

(73) Assignee: Mahle International GmbH (DE)

( * ) Notice: Subject to any disclaimer, the term of this patent is extended or adjusted under 35 U.S.C. 154(b) by 155 days.

(21) Appl. No.: 13/877,577

(22) PCT Filed: Sep. 22, 2011

(86) PCT No.: PCT/EP2011/066473
§ 371 (c)(1),
(2), (4) Date: Jul. 16, 2013

(87) PCT Pub. No.: WO2012/045583
PCT Pub. Date: Apr. 12, 2012

(65) Prior Publication Data
US 2013/0291503 A1    Nov. 7, 2013

(30) Foreign Application Priority Data
Oct. 4, 2010  (DE) .......................... 10 2010 041 948

(51) Int. Cl.
| | |
|---|---|
| *F02M 35/02* | (2006.01) |
| *B01D 46/00* | (2006.01) |
| *B01D 46/10* | (2006.01) |
| *F02M 35/024* | (2006.01) |

(52) U.S. Cl.
CPC ....... *F02M 35/0205* (2013.01); *B01D 46/0005* (2013.01); *B01D 46/10* (2013.01); *F02M 35/0203* (2013.01); *F02M 35/024* (2013.01)

(58) Field of Classification Search
CPC ............... B01D 46/0005; B01D 46/10; F02M 35/0203; F02M 35/0205; F02M 35/024
USPC ........................................................... 55/503
See application file for complete search history.

(56) References Cited

U.S. PATENT DOCUMENTS

| | | | |
|---|---|---|---|
| 5,026,478 A * | 6/1991 | Tanabe et al. ................. | 210/232 |
| 5,391,212 A | 2/1995 | Ernst et al. | |
| 5,720,790 A * | 2/1998 | Kometani et al. ............... | 55/497 |
| 5,725,624 A | 3/1998 | Ernst et al. | |
| 6,293,984 B1 * | 9/2001 | Oda et al. ......................... | 55/497 |
| 6,334,887 B1 * | 1/2002 | Coulonvaux .................... | 95/273 |
| 6,461,396 B1 * | 10/2002 | Barker et al. ................... | 55/471 |

(Continued)

FOREIGN PATENT DOCUMENTS

| | | |
|---|---|---|
| DE | 4412474 A1 | 10/1995 |
| DE | 69917846 T2 | 6/2005 |

(Continued)

OTHER PUBLICATIONS

English abstract for DE-102004087799, Date Mar. 13, 2013.

(Continued)

*Primary Examiner* — Amber Orlando
*Assistant Examiner* — Britanny Precht
(74) *Attorney, Agent, or Firm* — Fishman Stewart Yamaguchi PLLC

(57) ABSTRACT

A filter device for gases may include a housing having a first housing and a second housing configured to axially abut each other in a flange regione. A plate-shaped filter element may have a circumferential seal arranged in the flange region. The first housing part may have two mutually opposite radial bearing faces in a flange region and the seal may have two radial sealing faces facing away from each other and each sealing face may bear flat against the respective bearing face.

20 Claims, 2 Drawing Sheets

(56) References Cited

U.S. PATENT DOCUMENTS

| | | |
|---|---|---|
| 6,568,540 B1 | 5/2003 | Holzmann et al. |
| 7,354,470 B2 * | 4/2008 | Condrad .................... 55/490 |
| 7,670,402 B2 * | 3/2010 | Miller ....................... 55/502 |
| 7,976,604 B2 * | 7/2011 | Desjardins ................. 55/503 |
| 8,147,576 B2 * | 4/2012 | Gillenberg et al. ......... 55/337 |
| 8,152,876 B2 * | 4/2012 | Gillenberg et al. ......... 55/337 |
| 8,394,158 B2 * | 3/2013 | Shimomura et al. ....... 55/385.3 |
| 8,409,317 B2 * | 4/2013 | Bannister ................... 55/503 |
| 8,518,139 B2 * | 8/2013 | Jessberger et al. ......... 55/495 |
| 2002/0040569 A1 * | 4/2002 | Reinhold .................... 55/498 |
| 2002/0069849 A1 * | 6/2002 | Stass et al. ................ 123/198 E |
| 2004/0206058 A1 * | 10/2004 | Bugli et al. ................ 55/385.3 |
| 2006/0080949 A1 * | 4/2006 | Moriyama et al. ......... 55/490 |
| 2006/0086075 A1 * | 4/2006 | Scott et al. ................. 55/498 |
| 2009/0145095 A1 * | 6/2009 | Juliar et al. ................ 55/359 |
| 2009/0211544 A1 * | 8/2009 | Frazier et al. .............. 123/41.86 |
| 2009/0320423 A1 * | 12/2009 | Merritt et al. .............. 55/498 |
| 2010/0146920 A1 * | 6/2010 | Iddings et al. ............. 55/502 |
| 2011/0173937 A1 * | 7/2011 | Nelson ...................... 55/497 |
| 2011/0308212 A1 | 12/2011 | Ruhland et al. |
| 2012/0186207 A1 * | 7/2012 | Ushiyama et al. ......... 55/493 |
| 2012/0272633 A1 * | 11/2012 | Scott et al. ................. 55/497 |

FOREIGN PATENT DOCUMENTS

| | | |
|---|---|---|
| DE | 102004020799 A1 | 11/2005 |
| DE | 102009008450 A1 | 8/2010 |
| EP | 0460169 A1 | 12/1991 |
| EP | 0982062 A2 | 3/2000 |
| EP | 1647701 A1 | 4/2006 |
| FR | 2691912 A1 | 12/1993 |
| GB | 2400574 A | 10/2004 |
| WO | WO-2008052610 A1 | 5/2008 |
| WO | WO-2009/150165 A1 | 12/2009 |

OTHER PUBLICATIONS

English abstract for EP-0490169, Date: Mar. 13, 2013.

* cited by examiner

FILTER DEVICE

CROSS-REFERENCE TO RELATED APPLICATIONS

This application claims priority to German Patent Application 10 2010 041 948.6 filed Oct. 4, 2010, and International Patent Application PCT/EP2011/066473 filed on Sep. 22, 2011, both of which are hereby incorporated by reference in their entirety.

TECHNICAL FIELD

The present invention relates to a filter device for gases, in particular air filter device, preferably for a fresh air system of an internal combustion engine, for example of a motor vehicle, according to the preamble of the claim.

BACKGROUND

WO 2009/150165 discloses a filter device for filtering gaseous fluids, which has a housing which has at least one first housing part and a second housing part which axially abut each other in a flange region. Furthermore, the filter device has a plate-shaped filter element, which is equipped with a circumferential seal, which engages in the flange region. A "plate-shaped" filter element or plate filter element extends substantially in a plane which extends transversely to the flow direction.

In the known filter device, the first housing part has in the flange region a radial bearing face which faces the housing interior, while the seal has in the flange region a radial sealing face which faces away from the housing interior and comes to bear radially in a sealing manner against the one bearing face of the first housing part when in the assembled state. Furthermore, the seal is supported radially on the second housing part on a side facing the housing interior.

DE 44 12 474 A1 discloses an air filter device in which a plate-shaped filter element with a circumferential seal engages in a flange region in which two housing parts border each other. The first housing part has in the flange region an axially open, circumferential receiving groove, into which the seal is axially inserted. The second housing part has an axially projecting, circumferential web, which is supported axially on an axial sealing face of the seal in the region of the receiving groove. In this air filter device, the two housing parts do not come to bear against each other directly, but only indirectly, namely via the seal.

A further filter device of this type is known from EP 1 647 701 B1.

SUMMARY

The present invention is concerned with the problem of specifying an improved embodiment for a filter device of the type mentioned in the introduction, which is comparatively easy to assemble and has an effective sealing effect.

This problem is solved according to the invention by the subject matter of the independent claim. Advantageous embodiments form the subject matter of the dependent claims.

The invention is based on the general concept, in a filter device in which the housing parts come to bear axially directly against each other in the flange region, of equipping the first housing with two mutually opposite radial bearing faces in the flange region and providing the seal with two radial sealing faces which face away from each other and bear flat against the bearing faces when in the assembled state. In this manner, two radially effective sealing zones which are radially spaced apart from each other are realised in the flange region. Because the two bearing faces are attached to the same housing part, the two sealing zones work in series, which increases the effectiveness of the achievable seal. Furthermore, the filter element can simple be mounted on the first housing part during assembly of the filter device in such a manner that the second housing part can be brought to bear axially against the first housing part without substantial axial assembly forces, in order fix the two housing parts in this relative position to each other. This achieves a significant simplification of the assembly process.

According to an advantageous embodiment, the first housing part can have an outer web, which runs around the flange region, projects axially and has the radially outer radial bearing face. The second housing part can then expediently have a supporting face which runs around the flange region and on which the outer web is axially supported. The two housing parts thus bear axially against each other via the supporting face and the outer web when in the assembled state. This ensures a defined relative position for the assembled state.

According to another advantageous embodiment, the seal can have a circumferential slot region which is axially open towards the second housing part radially between the sealing faces. This slot region gives the seal increased elasticity in the radial direction, as a result of which the two sealing faces can be compressed radially onto each other more easily, which makes it easier to introduce the seal into a receiving space formed on the first housing part between the two bearing faces.

According to an advantageous embodiment, a plurality of radial webs which are spaced apart from each other in the circumferential direction and by means of which radially opposite slot walls are supported radially on each other can be provided in the said slot region. With the aid of such radial webs, the seal can be stabilised again in the slot region, for example in order to increase the radial prestress forces with which the sealing faces come to bear radially against the bearing faces. Whereas the slot region in principle allows a radial adjustment of the sealing faces within the seal, the radial webs ensure that a sufficient radial prestress which counteracts such a radial compression is maintained.

According to another advantageous development, the radial webs can be formed integrally on the seal or integrally on the second housing part, in particular on the above-mentioned supporting face. It is likewise possible to form a plurality of radial webs integrally on the seal and a plurality of radial webs integrally on the second housing part, for example on the above-mentioned supporting face. The integration of the radial webs in the seal allows the radial webs to be produced particularly simply from the same material as the seal. However, it is in principle also possible to injection-mould the radial webs consisting of a different material to the seal with a two-component method. With the integral configuration of the radial webs on the housing part, a different material from that chosen for the seal can be chosen particularly simply for the radial webs. The radial webs can in particular have a higher rigidity than the seal as a result. It is thereby in particular possible owing to the slot region simply to mount the seal on the first housing part and to improve the sealing effect significantly by placing on the second housing part, the radial webs of the second housing part go into the slot region of the seal and the sealing faces produce forces which drive radially outwards in the seal. The radial webs on the housing side can then go in the circumferential direction, in each case between radial webs on the seal side, into the slot region.

Alternatively, it is likewise possible to form on the housing part, in particular on the above-mentioned supporting face, a web which runs in the circumferential direction and projects axially, the cross-sectional profile of which can taper, in particular with increasing distance from the housing part, and which is shaped and positioned in such a manner that it more or less goes into the slot region of the seal when the second housing part is mounted.

In another embodiment, the radial webs can be the same size or smaller than the slot region in the axial direction. Additionally or alternatively, the radial webs can have different sizes in the axial direction. Further, the radial webs can have outer sides which are spaced apart from each other in the circumferential direction and extend parallel to each other or obliquely to each other, it being possible for outer sides which are oblique in relation to each other to converge or diverge radially outwards. The above-described variants, which can be realised cumulatively or alternatively or in any combination, can in each case be used to set the elasticity of the seal in a targeted manner, in particular in the radial direction, in such a manner that particularly simple assembly is achieved with an adequate sealing effect.

According to another advantageous embodiment, the filter body can have a polygonal, in particular rectangular cross section in the axial direction. The above-mentioned slot region can have a radial recess in at least one corner region of the filter body, preferably in each corner region of the filter body, in particular on a radially outer slot wall. Such a recess allows the seal material, which is forced in the circumferential direction by the radial compression of the seal when the filter body is mounted on the first housing part, to be diverted into such a recess in the respective corner region. In particular the risk of fold formation and hardening within the respective sealing face can be avoided thereby. The respective recess is in this case not continuous in the radial direction, so it does not penetrate the seal. The radial depth of the respective recess is correspondingly smaller than a radial distance between the respective slot wall and the respective adjacent sealing face. Consequently, the sealing faces are designed to be interruption-free or continuous in the circumferential direction.

According to another advantageous embodiment, the first housing part can have a circumferential groove which is open towards the second housing part in the flange region, the mutually facing groove walls of which have or form the bearing faces. This groove then encloses the above-mentioned receiving space into which the seal can be axially inserted. The dimensions of this groove and the seal are preferably matched to each other in such a manner that an axial distance is present between the seal and a groove bottom situated between the groove walls. This means that the seal does not come up against a stop in the axial direction when used properly. This simplifies the mounting of the filter element on the first housing part.

It is advantageous if one of the housing parts has a protective collar which runs around the outside of the receiving space for the seal, at least in substantial regions. The protective collar preferably encircles the receiving space completely. The protective collar, which is formed, preferably integrally, with the housing part as an annular wall, prevents dirt from being able to penetrate directly to the seal when the filter device is in the assembled state. Furthermore, the protective collar prevents the sealing region from being damaged from outside by mechanical effects. To this end, the protective collar is preferably arranged on the housing part which receives the seal. The protective collar can be arranged at a distance from the receiving space, as a result of which a contour of the other housing part can engage, in particular contactlessly, in this spacing and thus form better protection for the seal or the sealing region.

According to another embodiment, the seal can have a circumferential axial sealing face radially between the radial sealing faces, which bears axially against a circumferential axial bearing face which is formed in the flange region on the second housing part. A third sealing zone is thereby formed on the seal, which zone interacts in an axially sealing manner with the second housing part.

It is particularly expedient if the filter device is operated or used in terms of its flow direction that a clean side is situated inside the first housing part, which clean side is separated by the filter element from an untreated side, which is situated inside the second housing part. Any leakages which occur can thus only take place on the untreated side, which is largely uncritical at least in a fresh air system of an internal combustion engine. However, an incorrect intake of air through the two sealing zones arranged in series between the seal and the first housing part is largely avoided.

In a specific embodiment, it can be provided for the axial bearing face to be arranged axially at the same height as the above-described axial supporting face on which the first housing part is axially supported on the second housing part.

According to another embodiment, the first housing part can have an inner web, which runs around the flange region, projects axially and has or forms the radially inner radial bearing face. In particular, the seal can then optionally have an axial sealing face which runs around the flange region and on which the inner web is axially supported. The sealing effect can thereby be additionally improved.

A radial spacing, which is penetrated by the seal, can expediently be present between the inner web and the second housing part. Additionally or alternatively, an axial spacing can be present between the axial sealing face which faces the inner web and an axial sealing face which faces the second housing part. Additionally or alternatively, the inner web can be shorter in the axial direction than an outer web of the first housing part. The above variants can be realised alternatively or cumulatively or in any combination. In particular, these features allow a specific geometric match between the housing parts and the seal to such an extent that the seal is positioned and supported in a dimensionally stable manner in the flange region. A comparatively high level of functional reliability can thereby be achieved for the seal.

The invention also relates to a filter element which is suitable for use in a filter device according to the invention. The filter element accordingly is characterised at least in that it is plate-shaped and has a circumferential seal, which has two radial sealing faces facing away from each other in the flange region.

The direction terms "axial" and "radial" refer to the assembly direction with which the filter element is mounted on the first housing part and in which the two housing parts are mounted on each other. This assembly direction then defines the axial direction, that is, the axial direction runs parallel to the assembly direction. Accordingly, the radial direction extends transversely to the assembly direction.

Further important features and advantages of the invention can be found in the subclaims, the drawings and the associated description of the figures using the drawings.

It is self-evident that the above-mentioned features and those still to be explained below can be used not only in the combination given in each case but also in other combinations or alone without departing from the scope of the present invention.

Preferred exemplary embodiments of the invention are shown in the drawings and are explained in more detail in the description below, the same reference symbols referring to the same or similar or functionally equivalent components.

BRIEF DESCRIPTION OF THE DRAWINGS

In the figures.

DETAILED DESCRIPTION

Figure 1:
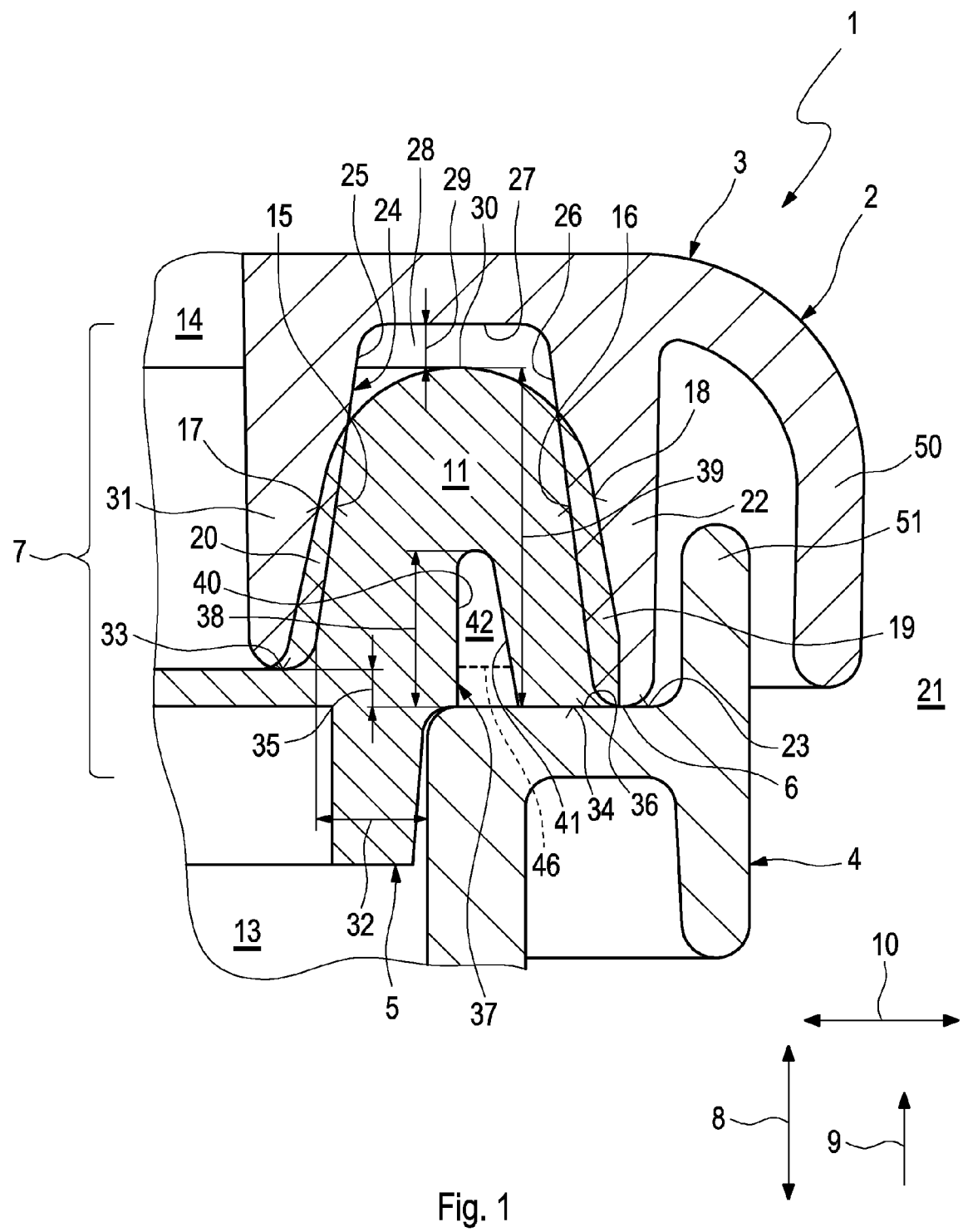
FIG. 1 schematically shows a highly simplified longitudinal section through a filter device in a flange region, FIG. 2 schematically shows a highly simplified axial view of a filter element in a corner region.

According to FIG. 1, a filter device 1 comprises a housing 2, which has at least one first housing part 3 and a second housing part 4. The filter device 1 also comprises a filter element 5 which is arranged in the housing 2. The filter arrangement 1 acts to filter gases, in particular air. The filter device 1 is thus preferably an air filter device. The air filter device 1 can for example be used in a fresh air system of an internal combustion engine which can be arranged in a motor vehicle.

The two housing parts 3, 4 abut each other axially at an abutment point 6 in a flange region 7. The housing parts 3, 4 are also connected in a detachable manner to each other, which is not shown here. The axial direction is indicated in FIG. 1 by a double arrow and referred to with 8. The axial direction 8 runs parallel to an assembly direction 9, which is likewise indicated by an arrow and in which the two housing parts 3, 4 are attached to each other. A further double arrow 10 indicates a radial direction, which runs transversely to the axial direction 8 and correspondingly also transversely to the assembly direction 9.

The filter element 5 is plate-shaped and can therefore also be referred to as a plate filer element 5. The filter element 5 extends in particular largely in a plane which extends transversely to the axial direction 8. The filter element 5 has a circumferential seal 11, which engages in the flange region 7. The seal 11 can in particular be injection-moulded or foamed onto a filter body 12, which can be seen in FIG. 2. The filter element 5 separates an untreated side 13 from a clean side 14 in the interior of the filter housing 2. As the filter element 5 is situated substantially between the two housing parts 3, 4, the untreated side 13 and the clean side 14 are arranged in different housing parts 3, 4. In the preferred example, the clean side 14 is thus situated in the first housing part 3, whereas the untreated side 13 is situated in the second housing part 4.

The first housing part 3 has two mutually opposite radial bearing faces 15 and 16 in the flange region 7. In relation to the housing interior, one bearing face 15 is arranged radially further inwards than the other bearing face 16, so the bearing faces 15, 16 can also be referred to as inner bearing face 15 and outer bearing face 16. The seal 11 has two radial sealing faces 17 and 18, which face away from each other and bear flat against the bearing faces 15, 16 when in the assembled state. In the diagram of FIG. 1, the seal 1 is shown in a non-compressed starting state, so in the diagram of FIG. 1 the sealing faces 17, 18 project radially over the associated bearing faces 15, 16. In reality, however, the seal 11 is compressed during assembly, as a result of which the sealing faces 17, 18 are shifted radially towards each other. In the installed state the radially inner sealing face 17 then bears against the inner bearing face 15, whereas the radially outer sealing face 18 bears against the outer bearing face 16. The sealing faces 17, 18 can also be referred to below as inner sealing face 17 and outer sealing face 18. The outer sealing face 18 forms together with the outer bearing face 16 a first or outer sealing zone 19 between the seal 11 and the first housing part 3. The inner sealing face 17 and the inner bearing face 15 form a second or inner sealing zone 20 between the seal 11 and the first housing part 3. The two sealing zones 19, 20 are arranged in series on the first housing part 3, as a result of which a particularly effective sealing effect is achieved. An incorrect air flow or leakage flow between the clean side 14 and an environment 21 of the housing 2 can thus be avoided.

The first housing part 3 has an outer web 22 in the flange region 7, which axial web projects axially from the first housing part 3 and runs in the circumferential direction. The outer web 22 has the outer bearing face 16. The second housing part 4 likewise has an axial supporting face 23 in the flange region 7, which supporting face runs in the circumferential direction. In the assembled state, the outer web 22 is supported axially on this supporting face 23. Direct contact at the contact point 6 and consequently defined positioning between the two housing parts 3, 4 is thereby produced in the axial direction 8.

The first housing part 3 can also have a circumferential groove 24 in the flange region 7, which groove is axially open towards the second housing part 4 and the mutually facing groove walls 25, 26 of which have or form the two bearing faces 15, 16. The groove 24 has a groove bottom 27 between the two groove walls 25, 26. The said groove 24 delimits with its groove walls 25, 26 and groove bottom 27 a receiving space 28 into which the seal 11 is axially inserted. The groove 24 and the seal 11 are matched to each other in terms of their dimensions in such a manner that an axial distance 29 is present in the axial direction 8 between the seal 11 and the groove bottom 27, that is, a gap or a spacing between the groove bottom 27 and an axial end face 30, which faces the groove bottom 27, of the seal 11.

In the example of FIG. 1, the first housing part 3 is also provided with an inner web 31, which is arranged circumferentially in the flange region 7, projects axially from the first housing part 3 and has the inner bearing face 15. The two webs 22, 31 thus form the groove walls 25, 26 and thereby define the groove 24. It can be seen that the groove walls 25, 26 in the axial section shown have a straight profile, the groove walls 25, 26 running towards each other, that is, converging or tapering, in the direction of the groove bottom 27.

A radial spacing 32 can be provided between the inner web 31 and the second housing part 4, through which the seal 11 is guided. Further, the inner web 31 is shorter in the axial direction 8 than the outer web 22.

The seal 11 can have a circumferential axial sealing face 33 in the flange region 7, on which sealing face the inner web 31 is axially supported. An axial spacing 35 can likewise be present between this axial sealing face 33 which faces the inner web 31 and a further axial sealing face 34, which faces the second housing part 4, of the seal 11. In the assembled state, this spacing corresponds with the axial length difference between the two webs 31, 22.

The seal 11 has the said sealing face 34, which is likewise circumferential and which is situated on the seal 11 between the radial sealing faces 17 and 18. A circumferential axial bearing face 36, against which the axial sealing face 34 comes to bear axially when in the assembled state, is formed in the flange region 7 on the second housing part 4. In the specific embodiment shown here, this axial bearing face 36 and the above-mentioned axial supporting face 23 are arranged axially at the same height. In particular, the supporting face 23 and the bearing face 36 can merge into each other in a transition-free manner or be formed by a common axial face which extends in a plane which runs transversely to the axial direction 8.

According to a particularly advantageous embodiment, the seal 11 can have a circumferential slot region 37, which is axially open towards the second housing part 4 and which is arranged radially between the two radial sealing faces 17, 18. The slot region 37 goes axially into the seal 11 without penetrating it in the axial direction 8. For example, a slot depth 38 in the axial direction 8 is no more than half the size of an axial height 39 of the seal 11. The axial height 39 of the seal 11 corresponds here to the axial spacing between the axial end face 30 and the axial sealing face 34. In longitudinal section, the slot region 37 has a cross-sectional profile which tapers with increasing penetration depth into the seal 11 and thus has in particular converging slot walls 40, 41.

A plurality of radial webs 42 which are spaced apart from each other in the circumferential direction can be provided in the slot region 37. The radially mutually opposite slot walls 40, 41 can be supported radially on each other by means of these radial webs 42. The radial webs 42 are expediently formed integrally on the seal 11. In an alternative embodiment, the radial webs 42 can also be formed integrally on the second housing part 4. A embodiment which comprises both radial webs 42 which are integrated in the seal 11 and radial webs 42 which are integrated in the second housing part 4 is likewise conceivable, housing-side radial webs 42 then going into the slot region 37 in the circumferential direction between seal-side radial webs 42.

Instead of a plurality of radial webs 42 spaced apart from each other in the circumferential direction, a circumferential, axially projecting web can also be formed on the second housing part 4, which web goes axially into the slot region 37 when the second housing part 4 is mounted.

A protective collar 50 is arranged circumferentially around the outside of the outer web 22. This protective collar 50 is formed in one piece with the first housing part 3. A contour 51 or a wall region 51 of the second housing part 4 engages between the outer web 33 and the protective collar 50. A "chicane" is thus formed between the housing parts 3 and 4, which prevents direct action of mechanical forces or penetration of dirt. Moreover, coarse positioning of the housing parts 3, 4 with respect to each other can be achieved by this "chicane", as a result of which assembly is made easier.

Figure 2:
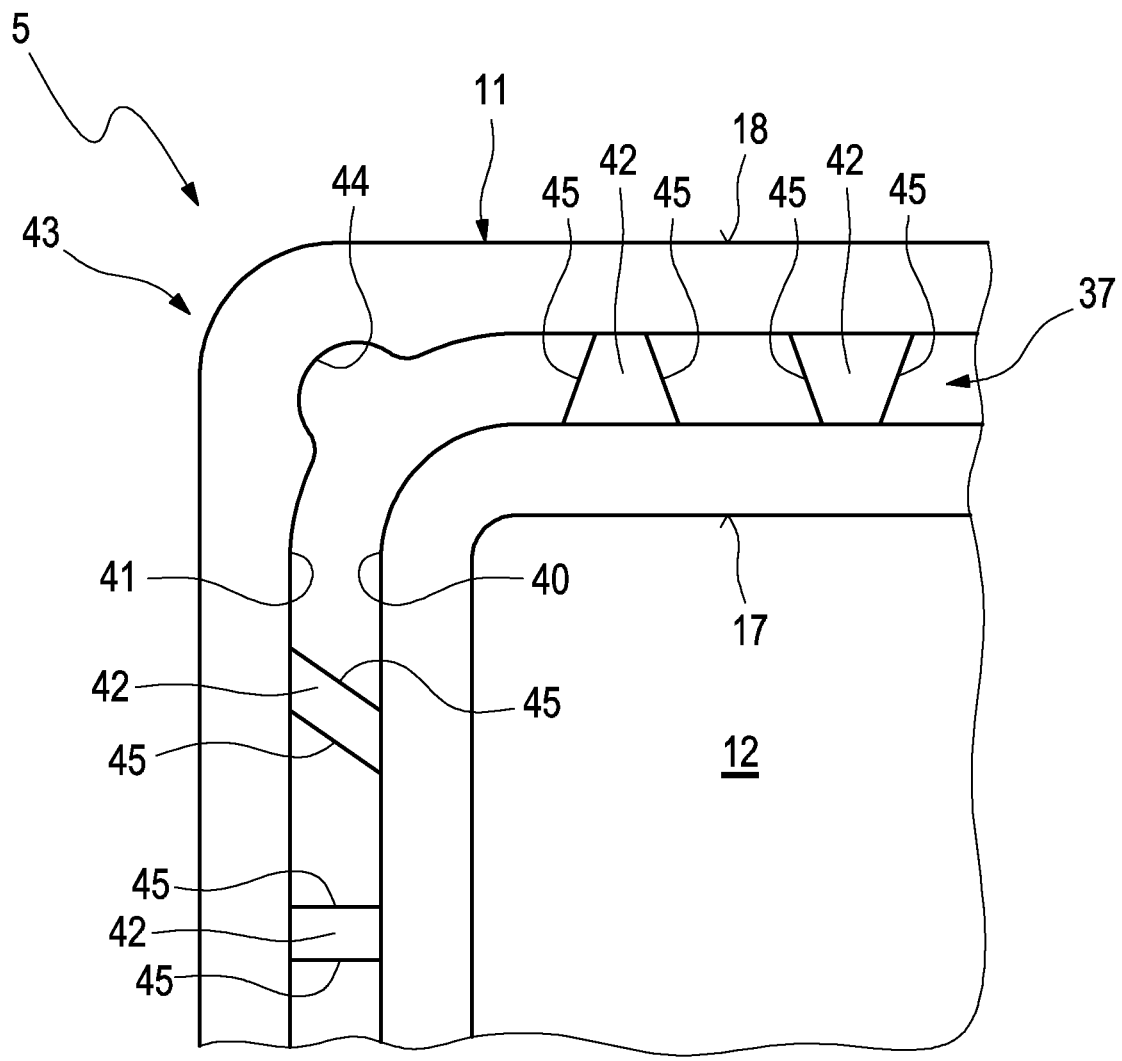

According to FIG. 2, the filter element 5 can have a polygonal, preferably rectangular, cross section in the axial direction, which has a plurality of corner regions 43. In at least one such corner region 43, the slot region 37 can have a radial recess 44. In the example, the said recess 44 is situated in the radially outer slot wall 41. It can be seen that the recess 44 does not penetrate the seal 11. For example, the recess 44 reaches no more than half the wall thickness of the seal 11 in the [ . . . ] between the slot region 37 and the respective adjacent sealing face 17 or 18.

As can be seen in FIG. 2, the radial webs 42 can each have two outer sides 45, which face away from each other in the circumferential direction. FIG. 2 shows different embodiments of the radial webs 42, which can expediently be used alternatively or else can also be realised cumulatively or in virtually any combination. Four different radial webs 42 are shown by way of example in FIG. 2, which are referred to below clockwise as the first, second, third and fourth radial web 42. In the first radial web 42, the outer sides 45 extend parallel to each other and parallel to the radial direction. In the second radial web 42, the two outer sides 45 again extend parallel to each other but are oblique to the radial direction. In the third radial web 42, the associated outer sides 45 extend obliquely to each other in such a manner that they converge radially outwards. In the fourth radial web 42, the outer sides 45 again extend obliquely to each other, but in such a manner that they diverge radially outwards.

Besides, the radial webs 42 can be the same size in the axial direction 8 as the slot region 37 regardless of the orientation of their outer sides 45. It is likewise possible for the radial webs 42 to be smaller in the axial direction 8 than the slot region 37. All the radial webs 42 can be the same size in the axial direction 8. It is likewise possible for the radial webs 42 to be provided with different sizes in the axial direction 8. In FIG. 1, an end-face-side end, which faces the second housing part 4, of a radial web 42 which is shorter in the axial direction 8 than the depth 38 of the slot region 37 is indicated with a dashed line 46.

The invention claimed is:

1. A filter device for gases, comprising:
a housing having at least one first housing part and a second housing part configured to axially abut each other in a flange region,
a plate-shaped filter element having a circumferential seal arranged in the flange region,
wherein the first housing part has two mutually opposite radial bearing faces in the flange region, and
wherein the seal has two radial sealing faces facing away from each other separated by a circumferential slot region defined between radially opposite slot walls and being open towards the second housing part, the slot region delimiting an axial space from the second housing part extending around the seal in a circumferential direction, wherein the slot region includes a plurality of circumferentially spaced radial webs supported by the opposite slot walls, the plurality of radial webs occupying at least partially the axial space, and wherein each sealing face bears flat against a respective one of the bearing faces.

2. The filter device according to claim 1,
wherein the first housing part has an outer web extending around the flange region and projecting axially, the outer web having the radially outer radial bearing face, and
wherein the second housing part has an axial supporting surface extending around the flange region and configured to support the outer web.

3. The filter device according to claim 1, wherein the radial webs are formed at least one of integrally on the seal and integrally on the second housing part.

4. The filter device according to claim 1, wherein the radial webs at least one of:
include an extent in an axial direction less than an extent of the axial space in the slot region, and
have different sizes in the axial direction.

5. The filter device according to claim 1,
wherein the filter element has a polygonal cross section in an axial direction, and
wherein the slot region has a radial recess penetrating at least one of the slot walls in at least one corner region of the filter element thereby reducing a thickness of the slot wall in a region of the radial recess as compared to a region circumferentially spaced from the radial recess.

6. The filter device according to claim 1,
wherein the first housing part defines a circumferential groove in the flange region, the groove opening axially towards the second housing part and the bearing faces,
wherein an axial spacing is defined between the seal and a groove bottom and is situated between the bearing faces.

7. The filter device according to claim 1,
wherein the seal has a circumferential axial sealing face extending radially between the radial sealing faces, the circumferential axial sealing face configured to bear axially against a circumferential axial bearing face formed in the flange region on the second housing part,
wherein the axial bearing face is arranged axially at the same height as an axial supporting surface.

8. The filter device according to claim 1,
wherein the first housing part has an inner web extending around the flange region and projecting axially, the inner web having the radially inner radial bearing face, and
wherein the seal has an axial sealing surface extending around the flange region and configured to support the inner web.

9. The filter device according to claim 8,
wherein a radial spacing is defined between the inner web and the second housing part and is configured to be penetrated by the seal
wherein an axial spacing is defined between the axial sealing face facing the inner web and an axial sealing face facing the second housing part, and
wherein the inner web is shorter in the axial direction than an outer web.

10. The filter device according to claim 8, wherein a radial spacing is defined between the inner web and the second housing part and is configured to be penetrated by the seal.

11. The filter device according to claim 8, wherein an axial spacing is defined between the axial sealing face facing the inner web and an axial seal face facing the second housing part.

12. The filter device according to claim 1, wherein the radial webs have outer sides facing away from each other in the circumferential direction and extending parallel to each other and to the radial direction.

13. The filter device according to claim 1, wherein the radial webs have outer sides facing away from each other in the circumferential direction and extending obliquely to each other, wherein the radial webs at least one of converge or diverge radially outwardly.

14. The filter device according to claim 1, wherein a plurality of radial webs are formed integrally on the seal and on the supporting surface of the second housing part.

15. The filter device according to claim 1, wherein the axial space delimited by the slot region extends uninterrupted between adjacent radial webs.

16. The filter device according to claim 5, wherein the slot region defines a radial recess in every corner region of the filter element on a radially outer slot wall.

17. A filter device, comprising:
a housing including a first housing part and a second housing part configured to axially abut each other in a flange region, wherein the first housing part defines a circumferential groove in the flange region opening axially towards the second housing part, the groove defined by two opposing radial bearing faces;
a plate-shaped filter element having a circumferential preformed seal arranged in the groove of the flange region, the seal defining a structure including two radial sealing faces facing away from each other separated by a circumferential slot region defined between radially opposite slot walls, the slot region being open axially towards the second housing part and delimiting an axial space from the second housing part extending around the seal in a circumferential direction, wherein the respective sealing faces bear against a respective one of the bearing faces; and
a plurality of circumferentially spaced radial webs disposed in the slot region and extending between the slot walls, at least one of the plurality of radial webs being formed integrally on the seal;
wherein the axial space delimited by the slot region extends continuously between adjacent radial webs.

18. The filter device according to claim 17, wherein the slot region includes at least one radial recess penetrating at least one of the slot walls in a radial direction thereby reducing a thickness of the slot wall in a region of the radial recess compared to a region circumferentially spaced from the radial recess.

19. A filter device, comprising:
a housing including a first housing part and a second housing part configured to axially abut each other in a flange region, wherein the first housing part includes two mutually opposite radial bearing faces in the flange region; and
a plate-shaped filter element having a circumferential seal arranged in the flange region, the filter element defining a polygonal cross-section in an axial direction of the housing;
wherein the seal has two radial sealing faces facing away from each other separated by a circumferential slot region defined between radially opposite slot walls, the slot region being open towards the second housing part and delimiting an axial space from the second housing part extending around the seal in a circumferential direction, wherein each sealing face of the seal bears flat against a respective one of the bearing faces; and
wherein the slot region of the seal has a radial recess penetrating at least one of the slot walls in at least one corner region of the filter element thereby reducing a thickness of the slot wall in a region of the radial recess as compared to a region circumferentially spaced from the radial recess.

20. The filter device according to claim 19, wherein the slot region defines a radial recess in each corner region of the filter element on the radially outer slot wall of the seal.

* * * * *